United States Patent
Pradhan et al.

(10) Patent No.: US 9,275,110 B2
(45) Date of Patent: Mar. 1, 2016

(54) DISK-BASED HASH JOIN PROCESS

(71) Applicant: ParAccel, Inc., Campbell, CA (US)

(72) Inventors: Mayank Pradhan, San Jose, CA (US);
David Galimberti, Ann Arbor, CA (US);
Brian Pak-Ning Chu, San Diego, CA (US);
David Wilhite, Jr., Saratoga, CA (US);
Adam Birnbaum, La Jolla, CA (US);
Raymi Dyskant, Pittsburgh, PA (US)

(73) Assignee: ParAccel LLC, Campbell, CA (US)

( * ) Notice: Subject to any disclaimer, the term of this patent is extended or adjusted under 35 U.S.C. 154(b) by 188 days.

(21) Appl. No.: 13/783,040

(22) Filed: Mar. 1, 2013

(65) Prior Publication Data

US 2014/0250142 A1    Sep. 4, 2014

(51) Int. Cl.
*G06F 7/00* (2006.01)
*G06F 17/30* (2006.01)
*G06F 9/26* (2006.01)
*G06F 9/34* (2006.01)
*G06F 12/10* (2006.01)
*G06F 15/16* (2006.01)

(52) U.S. Cl.
CPC ...... *G06F 17/30498* (2013.01); *G06F 12/1018* (2013.01); *G06F 17/3033* (2013.01); *G06F 17/30442* (2013.01); *G06F 17/30595* (2013.01)

(58) Field of Classification Search
CPC .......... G06F 17/3033; G06F 17/30442; G06F 17/30595; G06F 12/1018
USPC ............................ 707/747, 765, 954; 711/206
See application file for complete search history.

(56) References Cited

U.S. PATENT DOCUMENTS

| | | | | |
|---|---|---|---|---|
| 5,978,793 A * | 11/1999 | Kashyap et al. | ....... | 707/999.003 |
| 6,226,639 B1 * | 5/2001 | Lindsay et al. | ........ | 707/999.005 |
| 2003/0065688 A1 * | 4/2003 | Dageville et al. | ...... | 707/999.205 |
| 2005/0222965 A1 * | 10/2005 | Chaudhuri et al. | .... | 707/999.001 |
| 2006/0116989 A1 * | 6/2006 | Bellamkonda et al. | ...................... | 707/999.003 |

OTHER PUBLICATIONS

Raghu Ramakrishnan and Johannes Gehrke. Database Management Systems, third edition. McGraw-Hill, New York, 2003 title pages, Preface and Sections 14.3 and 14.4, pp. iii, iv, xxiv-xxviii and 447-468.*

Ramez Elmasri and Shamkant B. Navathe. Fundamentals of Database Systems, third edition. Addison Wesley Longman, New York, 2000, title pages, Preface and Sub-Section 18.2.3, pp. iii, iv, vii, viii and 594-600.*

* cited by examiner

*Primary Examiner* — Usmaan Saeed
*Assistant Examiner* — Brian E. Weinrich
(74) *Attorney, Agent, or Firm* — Fenwick & West LLP

(57) ABSTRACT

A database system performs hash join process for processing queries that join an inner and an outer database table. The hash join processes builds a hash table in memory for the inner table. The database system receives a limit on the memory for storing the hash table. The database system maximizes the number of partitions stored in memory for the hash table. If the hash table exceeds the limit of the memory while adding rows from the inner table, the database system selects a partition for spilling to a persistent storage. The partition selected for spilling to may be the largest partition or a partition larger than most of the partitions. The database system initializes the hash table to a number of partitions that is substantially equal to half of the total number of blocks that can be stored within the specified limit of memory for the hash table.

21 Claims, 5 Drawing Sheets

DISK-BASED HASH JOIN PROCESS

BACKGROUND

This invention relates to joining tables in databases, and in particular to hash join method of joining tables in databases.

Relational database store information as tables or relations. For example, in a database schema describing an organization, one relation may store information describing employees and another relation may store information describing departments. Each row of the department relation may represent a department and each row of the employee relation may represent an employee. Each relation may have a key that identifies a particular entity represented in the relation. For example, each employee may be associated with a key value that uniquely identifies the employee. Key values that identify employees can be employee id or social security numbers of employees. Similarly, the department relation may have a key based on the department name or a unique department id. The employee information may refer to a department associated with the employee using the corresponding department id. A user that wants to retrieve information combining the employee and department relation may issue a join query that specifies a join clause relating fields from the relation being joined.

Various techniques are used by databases to perform joins of tables including nested-loop join, sort-merge join, and hash join. A hash join algorithm typically builds a hash table for one of the relations and probes the hash table for each record of the other table in the join relation. For performance reasons it is preferable to store the data structures used in the hash-join process in memory rather than on persistent storage e.g., disk. However, several scenarios cause the hash-join process to run out of memory, thereby requiring the structures to be stored on disk. This causes the performance of the queries based on the hash join process to be degraded. Bad performance of queries often requires analysis by experts to determine how to speed up the queries and may consume significant resources of development and support teams of an organization.

SUMMARY

Embodiments of the invention process database queries using a hash join process. A database system receives a request to process a database query that specifies a join operation of an inner table and an outer table. The database system builds a hash table using the data from rows of the inner table. The database system receives a limit on memory used for storing the hash table. The hash table comprises a set of hash buckets and each hash bucket is associated with a hash code value. The database system applies a hash function to each row of the inner table to obtain a hash code value for the row and maps the row to the hash bucket corresponding to the hash code value. The database system adds rows of the inner table to the hash table. If addition of a new row causes the hash table to exceed the memory limit of the hash table, a partition of the hash table is selected for removal from the hash table. The memory used by the partition is reused for storing the new row. In an embodiment the selected partition is spilled to a persistent storage, i.e., the data of the partition stored on the persistent storage. The partition that is spilled is selected based on the size of the partition. For example, the partition selected for spilling may be the largest partition of the hash table or a partition that is larger than one or more of the partitions of the hash table.

In an embodiment, each hash bucket comprises blocks of data storing information from rows of the inner table. The database system determines a hash bucket and partition for storing data from a row and checks if there is available space in any data block of the hash partition. If there is available space in a data block of the hash partition, the database system adds the data of the row to the data block. If none of the existing data blocks of the hash partition have available space for storing the data of the row, the database system determines whether a new block of data can be added to the hash table. If a new block of data can be added without exceeding the limit on memory for the hash table, a new block of data is allocated and added to the hash partition and the data from the row added to the new data block. If adding a new block is determined to cause the hash table to exceed the limit on memory, the database system determines a partition of the hash table to spill, so as to make memory space available for the new row.

In an embodiment, the database system determines an initial number of partitions for building the hash table based on the number of blocks corresponding to the limit of memory of the hash table. In an embodiment, the initial number of partitions for the hash table is determined to half of the number of blocks corresponding to the memory limit. In another embodiment, the initial number of partitions for the hash table is determined to be a value within a small threshold value of half of the number of blocks corresponding to the memory limit.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment

Figure 1:
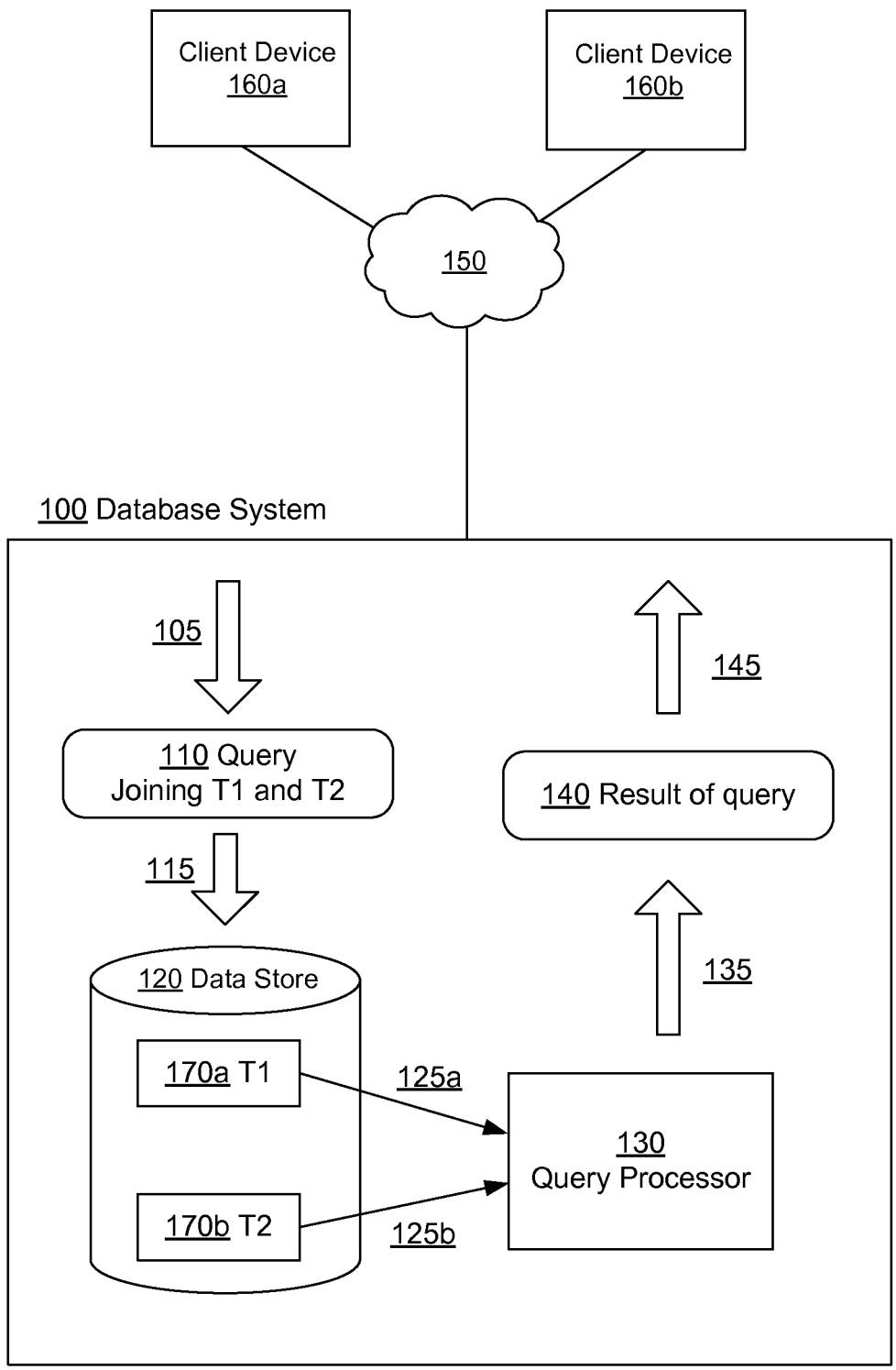
FIG. 1 illustrates the overall system environment for performing a hash-join process based on queries received from clients, in accordance with an embodiment of the invention.

FIG. 1 illustrates the overall system environment for performing a hash-join process based on queries received from clients, in accordance with an embodiment of the invention. As shown in FIG. 1, client devices 160 send queries to the database system 100 that determines the result of the queries and returns the result to the requesting client device 160 (A letter after a reference numeral, such as "170a," indicates that the text refers specifically to the element having that particular reference numeral, while a reference numeral in the text without a following letter, such as "170," refers to any or all of the elements in the figures bearing that reference numeral.)

The database system 100 may run on a server, for example, a standard x86 server running Linux or any other operating system. Users and applications may communicate with the database system 100 using standard interfaces, ANSI SQL via ODBC/JDBC. In an embodiment, the client devices may send requests using internet protocols, for example, the hyper text transfer protocol (HTTP). These requests may be received by a web server that processes the incoming request and interacts with the database system 100 to determine the result of the request.

Client devices 160 are computing devices that execute client software, e.g., a web browser 130 or built-in client application, to interact with the database system 100 via a network. Note that the terms "client" or "client device," as used herein may refer to software providing respective functionality, to hardware on which the software executes, or to the entities operating the software and/or hardware, as is apparent from the context in which the terms are used. For example, a client device may execute business intelligence software or analytic tools that send interact with a database system. In one embodiment, the client device 105 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc. In an embodiment, a client of the database system can be another process, for example, a web server that serves queries from remote devices.

The interactions between the client devices 160 and the database system 100 may be performed via a network 150, for example, via the internet. The network 150 enables communications between the client device 105 and the system 100. In one embodiment, the network 150 uses standard communications technologies and/or protocols. Thus, the network 150 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 150 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 150 can also include links to other networks such as the Internet.

The database system 100 stores data as tables 170, for example, tables T1 and T2 in the data store 120. The database system 100 receives 105 queries 110 from the client devices 160. A query 110 may join two or more tables 170, for example, tables T1 and T2. The query 110 typically specifies criteria for joining tables T1 and T2, for example, based on a column from T1 and a column from T2. The query processor 130 retrieves 120 data from tables T1 and T2. The query processor 130 performs the processing required to determine the result of the requested query 110.

The query processor determines 135 the result 140 of the query. For example, the result 140 of the query may include data from columns requested by the query that satisfy the criteria specified in the query 110. The result 140 of the query is returned 145 to the client device 160 that sent the request. The result returned by the query processor 130 may be further processed, for example, by a program specified in a programming language such as JAVA, C, or C++ and the processed result returned to the client device 140. For example, the result returned by the query processor 130 may be converted by an application to a markup language document, for example, a hypertext markup language (HTML) document and returned to the client device 160 for display using a browser application.

The query processor 130 may join the tables T1 and T2 using a hash-join method to determine the result of the query 110. The two tables may be joined using one or more join attributes from each table. A hash table structure is built using one of the input relations, say the inner relation. The smaller relation may be selected for building the hash table. The other relation, called the outer relation is scanned and for each row of the outer relation, the hash table structure is accessed to find a row from the first relation that matches the row of the second relation based on the join criteria. The hash table is accessed by applying a hash function to the join attribute of the inner relation. The phase of building the hash table structure is called the build phase and the phase of using the hash table structure to find matching rows is called the probe phase.

A database system 100 may allocate limited amount of memory for executing a hash-join process. The memory (or random access memory or RAM) is a storage device with faster access compared to persistent storage devices, for example, disks. However, the total capacity of memory in a computing device (or computer) is less compared to the total capacity of persistent storage of the computing device. If the inner table or the smaller table is small enough that the entire hash structure is accommodated in-memory, the performance of the hash-join process is efficient. However, if the data structure needed for performing the hash join process does not fit in the memory of the computer executing the process, portions of the data structure may have to be stored on a slower access storage device, for example, persistent storage device such as a disk. In this situation, the performance of the hash-join process depends on how often the slower access storage device is accessed instead of the in-memory data structure. Frequent access to the slower access storage device degrades the performance of the hash-join process.

If during the probe phase of the hash-join process, the database system determines that a matching row from the inner table corresponding to a row of the outer table is not available in-memory but is available on disk, the partition corresponding to the row from the outer table is written to the disk for processing at a later stage.

Hash Table Structure

Figure 2:
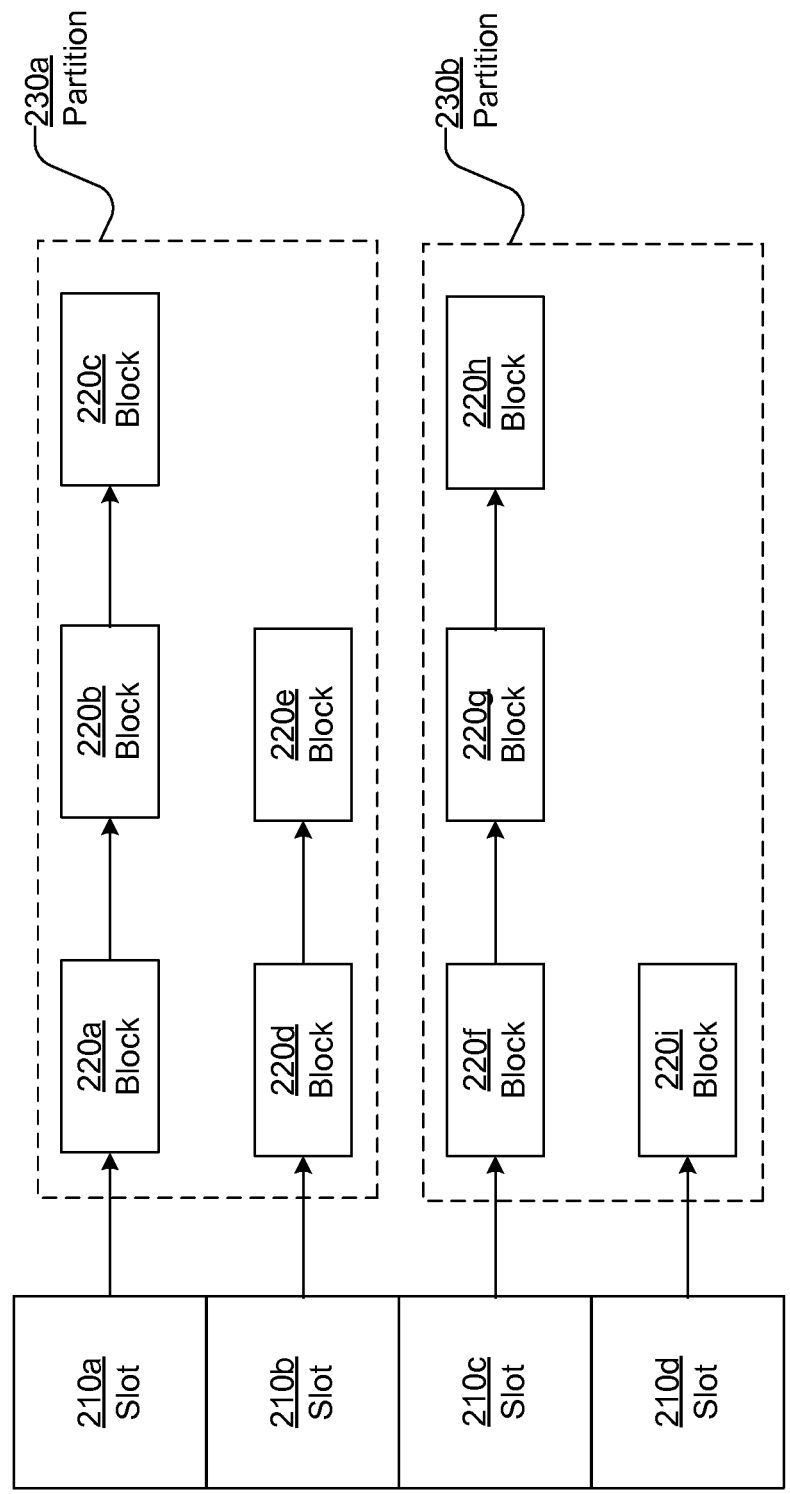
FIG. 2 illustrates the structure of a hash table built for an inner table for performing hash-join operation, in accordance with an embodiment.

FIG. 2 illustrates the structure of a hash table 200 built for an inner table for performing hash-join operation, in accordance with an embodiment. The join-keys refer to values from columns of the inner table used for finding matching rows of the tables being joined. A hash function is used to convert the join keys of the inner table to a hash code value. Each hash code, as computed by the hash function, maps to an entry or slot 210 into the hash table. The slot 210 (or hash bucket) points at a set of blocks 220. A block may comprise one or more records. Accordingly, the slot may be considered as pointing at a set of records. Records from hash buckets in the same partition are contained in data blocks (which can be either in memory or disk blocks). As shown in FIG. 2, slot 210a points to blocks 220a, 220b, and 220c. Similarly slot 210b points to blocks 220d and 220e, and so on. A chain of values having the same hash code value is referred to as a hash chain or a hash bucket. Accordingly, each slot 210 of the hash table points at a hash chain. A partition is a group of hash buckets that is treated as a unit for the purposes of storing the data on persistent storage. For example, partition 230a corresponds to the hash chains pointed at by slots 210a and 210b and partition 230b corresponds to the hash chains pointed at by slots 210c and 210d. If the database system determines that the amount of data requested for storage in the hash table exceeds the amount of memory allocated for the hash table, a partition may be spilled from the memory to disk. In other words, the data of the partition is stored in persistent storage to allow the memory space previously used by the partition to be used for additional data requested by the hash-join process.

System Architecture

Figure 3:
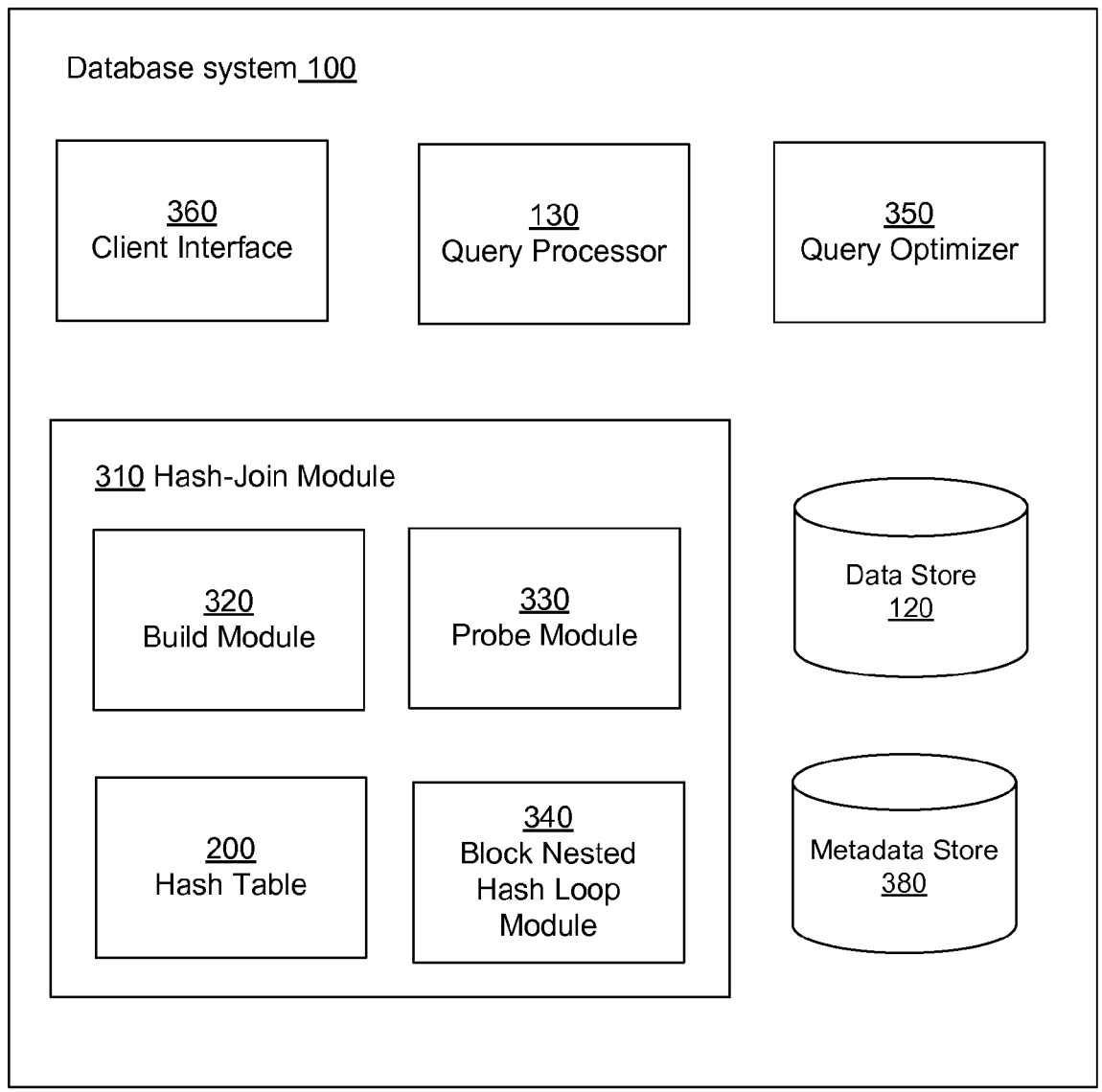
FIG. 3 shows the system architecture of a database system for performing hash-join process, in accordance with an embodiment.

FIG. 3 shows the system architecture of the database system for performing hash-join process, in accordance with an embodiment. The database system 100 comprises a client interface 360, a query processor 130, a data store 270, a query optimizer 350, a hash join module 310 and a metadata store 280. In alternative configurations, different and/or additional modules can be included in the system. Each module may invoke other modules to execute functionality provided by the other modules. The modules comprise executable code that is executed on a computer processor. The computer processor executing the database system 100 includes memory for storing data as well as persistent storage, for example, a disk. The memory used for storing data is random access memory and provides fast access to data compared to, for example, persistent storage. In the description of various embodiments herein, a disk may be used as an example of persistent storage. However other forms of persistent storage may be used, for example, flash memory. In other embodiments the memory and the persistent storage may be replaced with any hierarchical storage system in which there is a first storage mechanism and a second storage mechanism, the first storage mechanism faster than the second storage mechanism and the first storage mechanism having smaller storage capacity compared to the second storage mechanism.

The client interface 210 allows the database system 100 to interact with client devices 160. For example, the client interface 210 may present a user interface at the client device 160 that allows a user to interact with the database system. Actions taken by the user via the user interface may be processed by generating a database query that is processed so as to present information to the user. In an embodiment, the database system 100 includes a web server that allows clients to communicate with the database system using the internet.

The client device 160 may send a query for processing to the database system 100. The query processor 130 processes queries received by the database system 100 and returns the result to the requestor. Processing a query may comprise parsing the query, generating an execution plan for the query, and executing the query. The query optimizer 350 optimizes the execution plan to improve the performance of the queries. The data store 270 stores the data stored in the database for example, information describing various entities represented in the database such as employees, departments, products, and so on.

The metadata store 380 stores metadata describing the database, for example, information describing various objects stored in the database including tables, indexes, functions, and so on, and the relations between these objects. The metadata store 380 may include statistics describing various objects, for, example, sizes of the tables. The statistics stored in the metadata store 380 is used by the query optimizer 350 to optimize the execution plan. For example, the query optimizer 350 may select which type of process is used for performing a join operation. If the query optimizer 350 determines that two tables are being joined using a hash join operation, the query optimizer 350 decides which table is represented as the inner table represented as a hash table and which table is represented as the outer table in the probe phase.

The hash join module 310 performs the hash join process for joining tables. The hash join module comprises various other modules including a build module 320, a probe module 330, the hash table 200, and a block nested hash loop module 340. The hash table 200 as described in FIG. 2 stores data from one of the tables being joined in a hash join operation. The data of the hash table 200 is stored in memory of the computer executing the database system 100. The build module 320 performs the build phase of the hash join module that builds the hash table 200. The probe module 330 performs the probe phase of the hash join module 310 that takes rows from the outer table of the hash join operation and probes the hash table 200 by identifying rows stored in the hash table 200 that match rows from the outer table. The block nested hash loop module 340 performs a block nested hash loop process for joining portions of the tables being joined in certain situations, for example, if a left over partition is larger than the amount of memory allocated for processing the hash join operation.

Hash-Join Process

Figure 4:
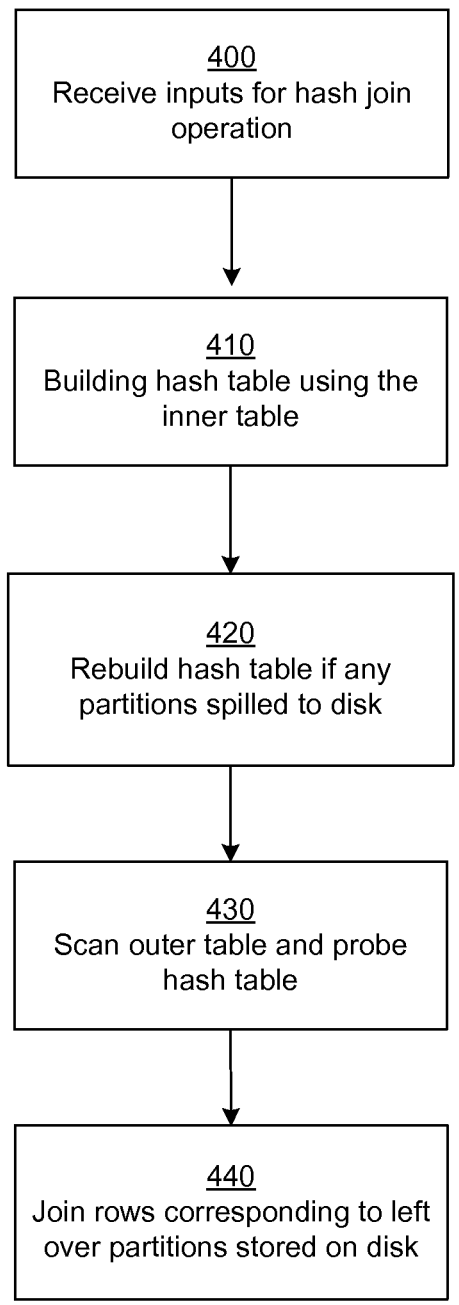
FIG. 4 shows a flowchart illustrating the steps of the hash-join process, in accordance with an embodiment.

FIG. 4 shows a flowchart illustrating a process for performing a hash-join operation, in accordance with an embodiment. The steps shown in FIG. 4 may be performed by the hash join module 230 and its subcomponents or other components of a database system. In the hash-join process described in FIG. 4 or in other embodiments, the rows processed may be a subset of the overall tables being joined. For example, a subset of the rows of the input tables may be determined based on a "where" clause of the query being processed. Other embodiments may use the techniques disclosed herein for processes related to a hash join process, for example, hash anti-join, hash semi-join, and the like.

The hash join module receives 400 inputs for a hash-join operation including information describing an inner table, an outer table and criteria for joining the two tables. The build module 320 builds 410 the hash table structure for the inner table. The building 410 of the hash table is also called the build phase. During the build phase, if the build module 320 determines that the hash table may not fit in the memory allocated for that purpose, the build module 320 may identify a partition and store it on the disk so that memory space previously occupied by the partition can be used for storing new data requested by the hash join process. This process is also called spilling a partition to the disk.

The next phase of the hash join operation is called the build-to-probe transition phase during which the build module 320 may clean up any intermediate structures created and prepare for the probe phase. In an embodiment, the build module 320 rebuilds 420 the entire hash table if any partition of the hash table had to be spilled to the disk during the build phase. For example, the build module 320 may first rebuild the hash table of any partitions that still have blocks in memory and then rebuild the hash table for each partition spilled to disk. The rebuilding 420 of the hash table ensures that an optimal set of partitions remain in memory before the probe step 430 begins. In an embodiment, the hash join module 310 sorts all the partitions of the inner table in an increasing order of their size, for example, the number of blocks in the partitions. In an embodiment, the build phase sorts the partitions in order of size and pushes out the largest partitions first to avoid the sort step of the hash join module 310. The hash join module 310 selects partitions for loading in memory in the order of their size starting from the smaller partitions first. The hash join module 310 selects the partitions for loading in memory while the total number of blocks of all the selected partitions is less than M, where M represents the limit on the number of blocks permitted for the hash join process. The hash join module 310 loads all the selected partitions in memory. This process maximizes the number of partitions loaded in memory.

The probe module 330 starts the probe phase in which the probe module 330 scans 430 the outer table and probes the hash table for each row of the outer table. The probe module 330 probes against the rows that are stored in memory in the hash table structure. If the probe module 330 determines that a row from the inner table matching a row from the outer table is not available in-memory but is stored on disk, the probe module 330 stores the row from the outer table also on disk. As a result, all rows from the outer table that match rows of inner table not stored in-memory get stored on disk so that they can be processed in a later phase. In an embodiment, the rows of the outer table that are stored on disk by the probe module are all stored as one partition of the outer table.

When the probe module 330 completes joining rows of outer table against the rows of the inner table stored in-memory, the probe module 330 performs a left-over phase in which the probe module 330 joins 440 the remaining rows that were not processed in the probe phase. These correspond to rows of the inner table that belong to the partitions spilled on disk and the matching rows of the outer table. In an embodiment, the probe module 330 reads the partition or partitions of the inner row that were spilled to the disk and performs the probe operation using these partitions on the corresponding partitions of the outer table that was stored on disk.

Figure 5:
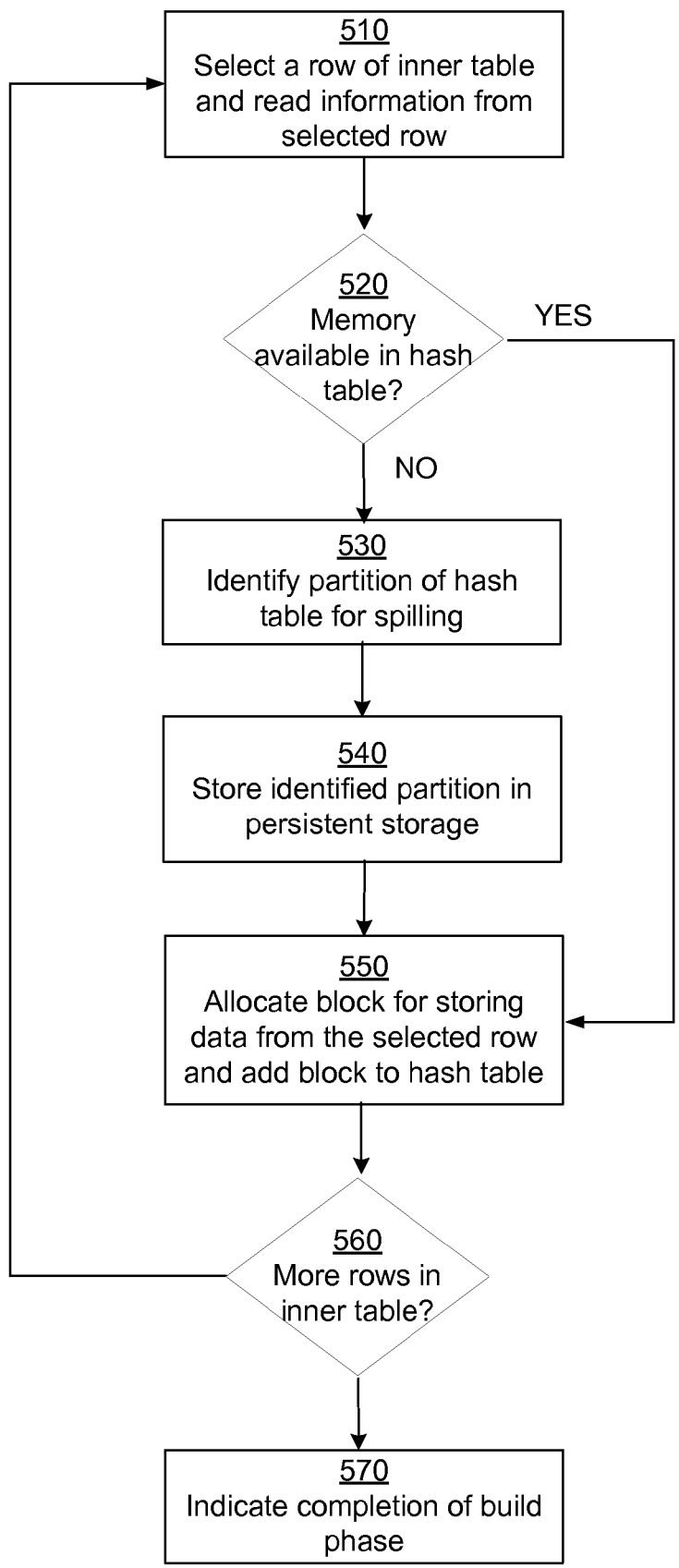
FIG. 5 shows a flowchart illustrating the details of a build phase of the hash-join process, in accordance with an embodiment.

FIG. 5 shows a flowchart illustrating the details of the build phase of the hash-join process, in accordance with an embodiment. The build module 320 reads rows from the inner table and keeps adding the rows to the hash table 200 being built. The build module 320 determines the hash code corresponding to each row read and maps the row to the hash bucket corresponding to the hash code. The build module 320 repeats this process for all the rows of the inner table. The build phase receives an estimate of the limit or the maximum size of the memory that can be allocated for the hash table.

As illustrated in FIG. 5, the build module 320 reads 510 information from the selected row of the inner table. The build module 320 determines the hash code value by applying the hash function to the join-keys of the next row. The build module 320 checks if the data read can be accommodated in an existing block of the hash table 200. If the data read can be accommodated in an existing block of the hash table 200, the build module identifies the appropriate block in the hash table and stores the data in the identified block. However, if the data read cannot be accommodated in an existing block, for example, if all available blocks are full to their capacity, the build module 320 determines 520 whether there is memory available in the hash table 200 to allocate a new block. In other words, the build module 320 determines 520 whether allocating a new block for storing data of the next row would cause the total memory allocated for the hash table 200 to exceed the limit allowed for the hash table 200.

If the build module 320 determines 520 that there is available memory in the hash table 200, the build module 320 allocates 550 a new block of data. The build module 320 stores the data from the next row into the new block of data allocated and adds the new block of data to the hash table 200. However, if the build module 320 determines 520 that there is no memory available in the hash table to allocate a new block, the build module 320 makes room for the new block of data by storing some of the data from the hash table to the persistent storage (e.g., disk.) Accordingly, the build module 320 identifies 530 a partition of the hash table for spilling to the disk. In an embodiment, the partition selected for spilling is selected based on the size of the partitions of the hash table. In particular the partition selected for spilling is larger than at least one or more partitions currently in the hash table. In an embodiment, the largest existing partition of the hash table is selected for spilling. In another embodiment, a set of the largest available partitions of the hash table is determined. This set comprises partitions that are larger than all partitions outside the set. The partition that is spilled is selected from the set of largest partitions.

The build module 320 stores 540 the identified partition of the hash table to the disk. As a result, the hash table 200 has capacity for new data blocks. Accordingly, the build module 320 allocates 550 a new data block and stores the information of the next row in the allocated block and adds the new block to the hash table 200. As a result, the memory space previously occupied by the spilled partition is reused for storing data from new rows of the inner table that are being processed by the hash join process.

The build module 320 checks 560 if there are more rows of the inner table to be processed. If the build module 320 determines that there are more rows of the inner table to be processed, the build module 320 reads 510 the next row and repeats the above steps 510, 520, 530, 540, 550, and 560. If the build module 320 determines that there are no more rows of the inner table to be processed, the build module indicates to the caller that the hash table 200 is built. Accordingly, the next phase of the hash-join process can be started, for example, the probe phase.

The choice of the number of partitions in the hash table 200 has a significant impact on the hash-join process performed using the hash table 200. If the number of partitions is too small, a single partition can become very large. As a result, if the large partition is selected for being stored on the disk instead of the memory, a large number of blocks of the inner table must be written to the disk. Furthermore, each block of the outer table that joins with these blocks during the probe phase must also be written to the disk. Furthermore, in some situations, a single partition may become too large to fit in the amount of memory allocated for the entire hash table. In this situation, the single partition cannot be loaded in the hash table.

In contrast, if the number of partitions is increased so as to have as many partitions as the total number of blocks of data that can be stored in the hash table, each partition has a single block and each block may have only a few rows of the inner table as determined by the hashing function. This may cause fragmentation of the memory. As a result, more memory may be allocated than required, for example, with several blocks being under-utilized and storing only a small amount of data compared to their capacity. The memory reserved by the hash join step is typically released after the hash join step is completed. If the hash table structure uses more memory than it actually needs, other intermediate steps that request memory may be denied their request for memory and may end up storing data on disk. This causes degradation of the overall process of determining the result of the query. Therefore, embodiments choose the number of partitions to be M/2, where M represents the limit on the number of blocks permitted in memory for the hash-join process. The number of partitions may be substantially equal to the value of M/2, for example, within a threshold value of M/2, the threshold value being a small numeric value.

In an embodiment, the query optimizer 350 provides an estimate of the number of blocks of data from inner table that is expected to be provided to the build phase. The query optimizer 350 provides these estimates based on statistics collected by the query optimizer 350 describing various tables of the database stored in the data store 120. The statistics collected by the query optimizer 350 may not be very accurate since the data in the tables can keep changing based on updates, deletes, and inserts. Accordingly, the actual number of blocks of data from the inner table that are received by the build phase may be different from the estimate provided by the query optimizer 350.

Assume that B represents a value of the estimate of the number blocks of data from the inner table as provided by the query optimizer 350. In an embodiment, if the value B≤M/2, i.e., the value if B is less than (or equal to) half of the value of M, the build module 320 starts the build phase with a single partition. If the estimate provided by the query optimizer 350 is such that the value of B≤M/2, the entire set of blocks of data of the inner table received during the build phase can be accommodated in the hash table. Accordingly, the build phase is completed by the build module 320 without overflowing any partitions to the disk.

However, if during the build phase the build module 320 determines that the actual number of blocks corresponding to the inner table is larger than the allotted memory for the hash table 200, i.e., B>M/2, the build module 320 reparations the hash table 200 by allocating the maximum number of partitions, i.e., M/2. Also, if the estimate of the number blocks of data of the inner table as provided by the query optimizer 350 is B blocks such that B>M/2, the build module 320 starts building the hash table using the maximum number of partitions, i.e., M/2 from the beginning of the build process.

The build module 320 attempts to maximize the number of partitions of the hash table 200 to avoid recursive partitioning. In other words, the embodiments disclosed avoid building large partitions that may have to be recursively converted to another hash table. The embodiments disclosed perform better than hash-join processes that perform recursive partitioning of the hash table 200. This is so because processes that use recursive partitioning of hash tables may identify the block for a given row of inner table by applying the hash function multiple times for each recursive level of the hash table. This is inefficient compared to a hash-join process that needs to apply the hash function only once to identify the block corresponding to a given row.

In some situations, there can be a skew in the mapping of blocks to hash codes, for example, a large number of blocks get mapped to the same hash code. This can happen due to the nature of data in the inner table or because of a particular choice of hash function used for determining the hash codes. In this situation, the hash join module 310 switches from the process described in FIG. 4 and FIG. 5 to a block nested hash loop process. In this situation, the block nested hash loop process is preferred over the recursive hash join process (which is an alternative). The block nested hash loop process may also be applied if the left over partition stored on the disk is too large to fit in the space allocated for the process in memory. In this situation, the block nested hash loop process is preferred over recursive hash join process.

The block nested hash loop module 340 performs the block nested hash loop process as follows. At the end of the probe phase, there may be two left over partitions, a left over partition from the inner table, called the left over build partition and a left over partition from the outer table called the left over probe partition. Assume that the left over partition from the build phase has P blocks, such that P>M. At this stage, the block nested hash loop module 340 has all of the working memory available to perform the block nested hash loop process. The block nested hash loop module 340 reads M−1 blocks in memory from the left over build partition and creates a new hash table. The nested hash loop module 340 reads one block from the left over probe partition. Using the join key values in this block nested hash loop module 340 probes the new hash table. After a block has been completely read, nested hash loop module 340 unpins the block, and reads in the next block to execute the join. Once all the blocks from the probe side have been read, the nested hash loop module 340 unpins the M−1 blocks of the left over build partition. Unpinning a block comprises either removing the block from the hash table or marking the block for being replaced from the hash table or for being overwritten as needed. The nested hash loop module 340 next reads in the next M−1 blocks (or fewer if fewer than M−1 blocks remain to be processed) to form a new hash table or overwrite the data in the previous hash table. The nested hash loop module 340 then reads the blocks from the left over probe partition one by one and processes them. This process requires the blocks of the left over probe partition to be read P/M times.

In an embodiment, at the end of the probe phase 540 or in the beginning of the step 440, the hash join module 310 compares the sizes of the left over partition from the inner table and the left over partition from the outer table. The hash join module 310 builds a hash table using the smaller of the two left over partitions and probes the hash table using the other left over partition. For example, if the left over partition from the inner table is smaller than the left over partition from the outer table, the hash join module 310 builds a hash table using the left over partition from the inner table and performs probe operations using data from the partition from the outer table. In contrast, if the left over partition from the inner table is larger than the left over partition from the outer table, the hash join module 310 builds a hash table using the left over partition from the outer table and performs probe operations using data from the partition from the inner table.

ALTERNATIVE APPLICATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for processing a database query, the method comprising:
   receiving a request to perform a database query specifying a join of an inner table and an outer table, wherein the inner table is smaller than the outer table;
   receiving a limit on memory used for storing a hash table;
   building the hash table using data from rows of the inner table, the hash table comprising one or more partitions, each partition comprising one or more hash buckets, each hash bucket storing data from rows that map to a hash code value based on a hashing function;
   receiving a request to add data of a new row of the inner table to the hash table;
   determining whether addition of data of the new row will cause the hash table to exceed the memory limit;
   responsive to determining that addition of data of the new row will cause the hash table to exceed the memory limit, selecting a partition of the hash table for spilling to a persistent storage area, the selecting based on whether the size of the selected partition exceeds sizes of at least a plurality of other partitions of the hash table;
   spilling the selected partition to the persistent storage area, the spilling comprising, storing data from the selected partition in the persistent storage area;
   reusing memory space obtained from spilling the selected partition to persistent storage for storing data of the new row;
   receiving rows from the outer table;
   for each row of the outer table, finding a matching row of the inner table using the hash table;
   determining that a particular row of the outer table matches a row of the inner table from a partition selected for reusing the memory space occupied by the partition;
   storing information describing the particular row on persistent storage in a left-over partition;
   and
   performing a join operation for each row of the outer table stored in the left-over partition and rows of each partition of inner table that was selected for reusing the memory space.

2. The computer-implemented method of claim 1, further comprising:
   responsive to determining that the number of rows remaining to be processed for the outer table is less than the number of rows remaining to be processed for the inner table, performing a hash join of the remaining rows of the inner table and the outer table by building a hash table using the remaining rows of the outer table.

3. The computer-implemented method of claim 1, further comprising:
   responsive to completion of the processing of rows of inner table for building the hash table, determining whether at least one partition of the hash table was selected for reusing the memory space of the partition; and
   responsive to determining that at least one partition of the hash table was selected for reusing the memory space, rebuilding the hash table by adding partitions to the hash table based on sizes of the partitions.

4. The computer-implemented method of claim 3, wherein rebuilding the hash table comprises:
   selecting a plurality of partitions for adding to the hash table, wherein the plurality of partitions are smaller than remaining partitions.

5. The computer-implemented method of claim 1, wherein selecting the partition for spilling comprises:
   identifying a set of partitions of the hash table comprising partitions that are larger than the remaining partitions of the hash table; and
   selecting one of the partitions from the set of the partitions for spilling to the persistent storage.

6. The computer-implemented method of claim 1, further comprising:
   responsive to receiving the request to add data of the new row to the hash table, determining whether the data of the new row can be added to an existing block of the hash table; and
   responsive to determining that none of the existing blocks of the hash table have capacity to store data from the new row, determining whether a new block can be added to the hash table.

7. The computer-implemented method of claim 1, wherein building the hash table comprises determining an initial number of partitions of the hash table to equal half of the number of blocks corresponding to the memory limit.

8. The computer-implemented method of claim 1, wherein building the hash table comprises determining an initial number of partitions of the hash table as a value within a small threshold value of half of the number of blocks corresponding to the memory limit.

9. The computer-implemented method of claim 1, wherein building the hash table comprises allocating two hash buckets per partition for a plurality of partitions of the hash table.

10. The computer-implemented method of claim 1, wherein building a hash table comprises:
    receiving an estimate of size of data of the inner table;
    determining whether the inner table can be entirely stored in the hash table based on the estimate of the size of data; and
    responsive to determining that the inner table can be accommodated in the hash table having a single partition for the hash table.

11. A non-transitory computer-readable storage medium storing instructions for:
    receiving a request to perform a database query specifying a join of an inner table and an outer table, wherein the inner table is smaller than the outer table;
    receiving a limit on memory used for storing a hash table;
    building the hash table using data from rows of the inner table, the hash table comprising one or more partitions, each partition comprising one or more hash buckets, each hash bucket storing data from rows that map to a hash code value based on a hashing function;
    receiving a request to add data of a new row of the inner table to the hash table;
    determining whether addition of data of the new row will cause the hash table to exceed the memory limit;
    responsive to determining that addition of data of the new row will cause the hash table to exceed the memory limit, selecting a partition of the hash table for spilling to a persistent storage area, the selecting based on whether the size of the selected partition exceeds sizes of at least a plurality of other partitions of the hash table;
    spilling the selected partition to the persistent storage area, the spilling comprising, storing data from the selected partition in the persistent storage area; and
    reusing memory space obtained from spilling the selected partition to persistent storage for storing data of the new row;
    receiving rows from the outer table;
    for each row of the outer table, finding a matching row of the inner table using the hash table;
    determining that a particular row of the outer table matches a row of the inner table from a partition selected for reusing the memory space occupied by the partition;
    storing information describing the particular row on persistent storage in a left-over partition; and
    performing a join operation for each row of the outer table stored in the left-over partition and rows of each partition of inner table that was selected for reusing the memory space.

12. The non-transitory computer-readable storage medium of claim 11, further comprising:
    responsive to determining that the number of rows remaining to be processed for the outer table is less than the number of rows remaining to be processed for the inner table, performing a hash join of the remaining rows of the inner table and the outer table by building a hash table using the remaining rows of the outer table.

13. The non-transitory computer-readable storage medium of claim 11, further comprising:
    responsive to completion of the processing of rows of inner table for building the hash table, determining whether at least one partition of the hash table was selected for reusing the memory space of the partition; and
    responsive to determining that at least one partition of the hash table was selected for reusing the memory space, rebuilding the hash table by adding partitions to the hash table based on sizes of the partitions.

14. The non-transitory computer-readable storage medium of claim 13, wherein rebuilding the hash table comprises:
    selecting a plurality of partitions for adding to the hash table, wherein the plurality of partitions are smaller than remaining partitions.

15. The non-transitory computer-readable storage medium of claim 11, wherein selecting the partition for spilling comprises:
    identifying a set of partitions of the hash table comprising partitions that are larger than the remaining partitions of the hash table; and
    selecting one of the partitions from the set of the partitions for spilling to the persistent storage.

16. The non-transitory computer-readable storage medium of claim 11, further comprising:
    responsive to receiving the request to add data of the new row to the hash table, determining whether the data of the new row can be added to an existing block of the hash table; and
    responsive to determining that none of the existing blocks of the hash table have capacity to store data from the new row, determining whether a new block can be added to the hash table.

17. The non-transitory computer-readable storage medium of claim 11, wherein building the hash table comprises determining an initial number of partitions of the hash table to equal half of the number of blocks corresponding to the memory limit.

18. The non-transitory computer-readable storage medium of claim 11, wherein building the hash table comprises determining an initial number of partitions of the hash table as a value within a small threshold value of half of the number of blocks corresponding to the memory limit.

19. The non-transitory computer-readable storage medium of claim 11, wherein building the hash table comprises allocating two hash buckets per partition for a plurality of partitions of the hash table.

20. The non-transitory computer-readable storage medium of claim 11, wherein building a hash table comprises:
    receiving an estimate of size of data of the inner table;
    determining whether the inner table can be entirely stored in the hash table based on the estimate of the size of data; and
    responsive to determining that the inner table can be accommodated in the hash table having a single partition for the hash table.

21. A computer system comprising:
    a computer processor; and
    a non-transitory computer-readable storage medium storing instructions for execution by the computer processor, the instructions for:
        receiving a request to perform a database query specifying a join of an inner table and an outer table, wherein the inner table is smaller than the outer table;
        receiving a limit on memory used for storing a hash table;
        building the hash table using data from rows of the inner table, the hash table comprising one or more partitions, each partition comprising one or more hash buckets, each hash bucket storing data from rows that map to a hash code value based on a hashing function;
        receiving a request to add data of a new row of the inner table to the hash table;
        determining whether addition of data of the new row will cause the hash table to exceed the memory limit;

responsive to determining that addition of data of the new row will cause the hash table to exceed the memory limit, selecting a partition of the hash table for spilling to a persistent storage area, the selecting based on whether the size of the selected partition exceeds sizes of at least a plurality of other partitions of the hash table;

spilling the selected partition to the persistent storage area, the spilling comprising, storing data from the selected partition in the persistent storage area; and reusing memory space obtained from spilling the selected partition to persistent storage for storing data of the new row;

receiving rows from the outer table;

for each row of the outer table, finding a matching row of the inner table using the hash table;

determining that a particular row of the outer table matches a row of the inner table from a partition selected for reusing the memory space occupied by the partition;

storing information describing the particular row on persistent storage in a left-over partition; and performing a join operation for each row of the outer table stored in the left-over partition and rows of each partition of inner table that was selected for reusing the memory space.

\* \* \* \* \*